United States Patent [19]
Guile

[11] Patent Number: 5,376,609
[45] Date of Patent: Dec. 27, 1994

[54] ACTIVATED CARBON BODIES HAVING BENTONITE AND CELLULOSE FIBERS

[75] Inventor: Donald L. Guile, Horseheads, N.Y.

[73] Assignee: Corning Incorporated, Corning, N.Y.

[21] Appl. No.: 109,950

[22] Filed: Aug. 23, 1993

[51] Int. Cl.$^5$ ............... B01J 20/20; B01J 20/24; B01J 20/12; B01J 20; B01J /28

[52] U.S. Cl. ..................... 502/62; 95/143; 502/80; 502/401; 502/404; 502/413; 502/527

[58] Field of Search ............ 502/62, 80, 413, 404, 502/402, 401, 527

[56] References Cited

U.S. PATENT DOCUMENTS

| | | | |
|---|---|---|---|
| 2,470,180 | 5/1949 | McHatton | 502/404 |
| 3,951,859 | 4/1976 | Ihaba et al. | 502/402 |
| 4,259,299 | 3/1981 | Hagiwara et al. | 423/210 |
| 4,518,704 | 5/1985 | Okabayashi et al. | 502/80 |
| 4,677,086 | 6/1987 | McCoe | 502/62 |
| 4,954,469 | 9/1990 | Robinson | 502/80 |

FOREIGN PATENT DOCUMENTS 57-122924 7/1982 Japan .

Primary Examiner—Paul E. Konopka
Attorney, Agent, or Firm—L. Rita Quatrini

[57] ABSTRACT

A body made of carbon particles bonded together with bentonite clay and cellulose fibers, wherein in weight percent based on carbon, the bentonite content is about 4% to 20%, and the cellulose fiber content is about 2% to 10%. A method of making the body which involves forming an aqueous mixture having a composition in weight percent based on carbon of about 5% to 8% organic binder which can be cellulose ethers, cellulose ether derivatives, and combinations of these, about 4% to 20% bentonite clay, about 2% to 10% cellulose fibers, and the balance being activated carbon particles, forming the mixture into a body, and drying the body.

12 Claims, 1 Drawing Sheet

ACTIVATED CARBON BODIES HAVING BENTONITE AND CELLULOSE FIBERS

This invention relates to a method of making an activated carbon body using a starting mixture of carbon particles, bentonite clay, and cellulose. More particularly, the mixture is extruded into a honeycomb structure.

BACKGROUND OF THE INVENTION

Activated carbon materials are commonly used to adsorb hydrocarbons and other impurities from gas streams (frequently air) and liquids. For these applications, the carbon is generally used in the form of granules. While activated carbon in the form of granules can perform the desired adsorption for many applications, there are some applications in which the granules have drawbacks. In some cases back pressure is a problem with the granules since the flow must follow a tortuous path. Some applications can result in considerable wear of the granules by attrition causing loss of material or bed packing. Furthermore, the fines which are generated as a result of attrition can block the flow path.

Another approach is to use an extruded activated carbon in the form of a cellular honeycomb. The honeycomb can readily be shaped by extruding fine powders of activated carbon with suitable binders. Such a shape allows for ease of flow of the gases through the honeycomb with little back pressure. Also, the geometry can be such as to allow easy access of the gases to all of the carbon for adsorption of the species to be removed. In the use of granules, the adsorbing species must diffuse into the center of the granule. This diffusion distance can be great compared to the thickness of the web of a honeycomb. Also, since a honeycomb is a solid piece, there should be little or no wear or attrition of the carbon.

Among the uses for such activated carbon honeycombs are the adsorption of hydrocarbon vapors in automotive applications. There are two automotive applications: (1) the evaporative emissions of vapors from the fuel system and the engine intake areas, and (2) cold start application.

In the case of evaporative emissions, the activated carbon adsorbs vapors given off from the fuel system while the vehicle is not operating, such as from the expansion and contraction of gases in the fuel tank with temperature swings. During refueling, the air which is displaced from the tank carries along considerable fuel as vapors which must be captured to meet future air pollution standards. The adsorbed species are then desorbed while the engine is operating and recycled back into the engine intake to be burned. Most vehicles today have an activated carbon canister filled with the granules to take care of some sources of vapors. However, this is not adequate to meet future requirements.

In the cold start application the activated carbon adsorbs hydrocarbons emitted during the initial 90 to 120 seconds after start-up of the engine. During this start-up period, the catalytic converter is not up to temperature for converting the hydrocarbons being emitted from the engine. Once the catalytic converter is up to temperature, the activated carbon can be removed from the exhaust system in a by-pass mode. The adsorbed hydrocarbons are desorbed from the activated carbon and are fed into the engine or into the exhaust ahead of the catalytic converter where they are converted to innocuous entities. The activated carbon is thus ready to adsorb hydrocarbons during the next cold start cycle.

In order to form an activated carbon honeycomb by extrusion, the carbon must be in the form of a fine powder. This can then be mixed with a liquid such as water and suitable plasticizers and binders. This plasticized mixture is then extruded through a die into the honeycomb shape, and dried.

Organic binders such as methylcellulose provide plasticity to the mixture. Such mixtures are soft and difficult to handle in the wet as extruded state before drying. Moreover, the bodies formed from such mixtures are relatively low in strength especially at elevated temperatures such as 250° C. which are encountered in applications such as auto exhaust purification. This is a result of the degradation of the organic binders.

High levels of some binders, such as the organic binders described above, result in decreased surface area in the body. As a result, the adsorption efficiency of the activated carbon decreases. This is an important consideration in hydrocarbon adsorption applications.

It is highly desirable to improve the strength of the extruded honeycomb both in the extruded state for further processing and handling and also after drying to improve performance.

Clays have been used as binders in carbon mixtures to impart strength to the carbon body formed therefrom.

U.S. Pat. Nos. 4,259,299, 4,518,704, and Japanese patent application publication no. 57-122924 (1982) relate to activated carbon bodies in which clay binders are used.

U.S. Pat. No. 4,259,299 relates to a process for removing ozone using activated carbon product made from a mixture of activated carbon and zeolite and organic and/or inorganic binder. The organic binder can be lignin; the inorganic binder can be bentonite. The material is heated to 350° C. to develop strength.

There remains a need to produce activated carbon bodies of improved strength to allow them to function effectively in high temperature applications such as in auto exhaust purification applications without sacrificing surface area and hence adsorption efficiency. The bodies must also have sufficient strength to be handled in the wet as-formed state to prevent deformation in handling. Also there remains a need to improve the handleability and formability characteristics of the forming mixtures.

The present invention meets these needs.

SUMMARY OF THE INVENTION

In accordance with one aspect of the invention, there is provided a body made of carbon particles bonded together with bentonite clay and cellulose fibers, wherein in weight percent based on carbon, the bentonite content is about 4% to 20%, and the cellulose fiber content is about 2% to 10%.

In accordance with another aspect of the invention, there is provided a method of making the body which involves forming an aqueous mixture having a composition in weight percent based on carbon of about 5% to 8% organic binder which can be cellulose ethers, cellulose ether derivatives, and combinations of these, about 4% to 20% bentonite clay, about 2% to 10% cellulose fibers, and the balance being activated carbon particles, forming the mixture into a body, and drying the body.

DETAILED DESCRIPTION OF THE INVENTION

Figure 1:
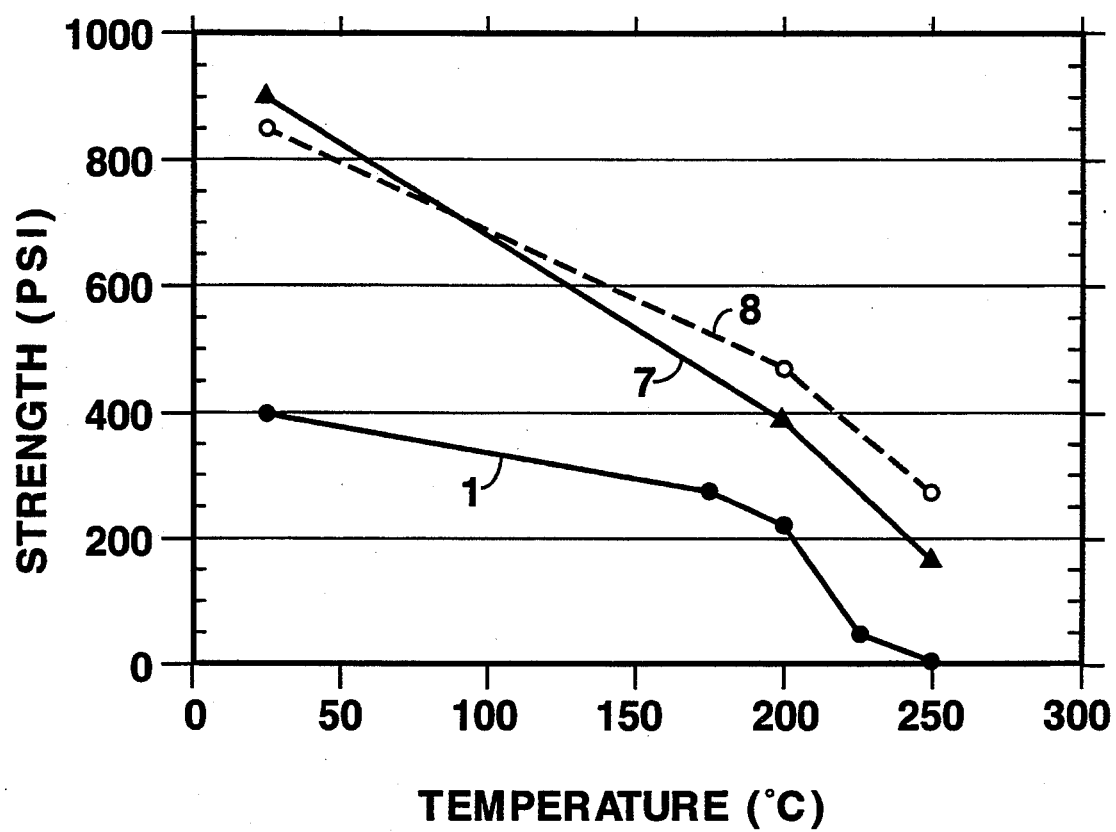
FIG. 1 is a plot of strength values of carbon honeycombs after exposure to various temperatures.

The present invention relates to a method for making a carbon body, which is typically an activated carbon honeycomb. The method involves forming an aqueous mixture of activated carbon particles, and bentonite clay as an inorganic binder, and cellulose fibers. The mixture is formed into a body, such as by extrusion, and dried. The combination of bentonite and cellulose imparts superior extrusion properties to the mixture, and strength after aging at high temperatures. For example, both bentonite and cellulose result in an improved tough cohesive mixture with cellulose contributing stiffness thereto. The combination results in excellent handleability and extrudability, and the body formed therefrom has good green strength and handleability in the wet as-formed state. The organic binder begins to burn out by about 200° C. and the bentonite and cellulose fibers together extend the strength of the bodies to higher use temperatures.

The Type of Carbon

Activated carbon is characterized by a very high surface area, generally above about 500 m$^2$/g, and more typically above about 1000 m$^2$/g, and a microstructure having a fissured surface and internal microporosity of pore sizes in the range of about 2 to about 10 angstroms. A primary tool for the characterization of activated carbon is BET surface area measurement using nitrogen adsorption.

Depending on the application, the nature of the activated carbon can vary as far as particle size, surface area, adsorption capacity for hydrocarbons, adsorption efficiency, porosity, pore size, etc. The carbon can be a single type or a blend of types based on for example, precursor source, particle size, porosity, etc.

For hydrocarbon adsorption applications, the preferred type of activated carbon is what is considered to be a collection of very small graphitic platelets which are bound together with an open structure leading to high surface area.

One source of activated carbon suitable for use in this invention is BPL F3 granular activated carbon available from Calgon Carbon Corp. which is available in several particle size ranges. A particular preferred variety of activated carbon from this source is the "6×16" mesh size, which can have a surface area of about 1050 to about 1300 m$^2$/g.

Preferably, about 75% to about 85% of the activated carbon powder is fine powder having an average particle size of about 3 to about 10 micrometers in diameter, and about 15% to about 25% of the powder is coarse having an average particle size in the range of about 20 to about 50 micrometers in diameter. Especially suited to the practice of the present invention are activated carbon such as Calgon Carbon BPL-F3 ® which in the practice of the present invention is ground to an average particle size of about 5 micrometers in diameter, and Nuchar ® SN-20, a coarse powder available from Westvaco, having an average particle size of about 30 micrometers in diameter.

The Organic Binder

Organic binder according to the present invention refers to cellulose ether type binders and/or their derivatives some of which are thermally gellable. Some typical organic binders according to the present invention are methylcellulose, ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are typically used in the practice of the present invention. Methylcellulose, hydroxypropyl methylcellulose, and combinations thereof are especially preferred. Preferred sources of cellulose ethers and/or derivatives thereof, are Methocel ® A4M and 20-333, F4 and F40 from Dow Chemical Co. Methocel ® A4M is a methylcellulose binder having a gel temperature of 50°– 55° C., and a gel strength of 5000 g/cm$^2$ (based on a 2% solution at 65° C.). Methocel ® 20-333, F4, and F40 are hydroxypropyl methylcellulose.

One advantage of the present invention is that there is no need for a co-binder such as polyvinyl alcohol. Therefore the organic binder content is lower than levels which are typical in the art. Having a lower organic content is desirable because organics block adsorption sites or porosity leading to the adsorption cites.

The Bentonite Clay

Bentonite refers to a class of clays containing montmorillonite as the essential mineral. This type of clay contains aluminum silicate with about 3–4 wt. % MgO. This is a very fine clay which can contribute plasticity to a mixture and contribute bonding power to both the as-formed and the dried bodies. Different grades of bentonite are available from different suppliers and can vary somewhat in particle size and impurities depending on the deposit from which they come and on the degree of processing. The clay is of fine particle size for even distribution throughout the mixture. Generally the average particle size of the bentonite is less than one micrometer in diameter. Suitable bentonite clays, especially as far as fine particle size, are those which are similar to that which was in the past supplied by Georgia Kaolin under the name of Bentolite L ®. Another suitable bentonite clay is supplied by Dry Branch Kaolin under the name of Bentonite K-129.

The Cellulose Fibers

The cellulose is a chopped and ground material from wood. It is of high purity and in the form of fibers. The fibers are insoluble in water unlike other cellulose based materials such as methylcellulose which are produced from similar fibers. The fibers must be short enough so as to not cause forming problems, such as blocking an extrusion die in an extrusion process. Typically, the fibers are −100 mesh (US Standard). One especially suited source of cellulose is supplied by International Filler Corporation under the name of Alpha-Cel C-100.

Unless otherwise indicated, the weight percents of the components and water in the mixture are based on the carbon content. For example, the percent of any component or water in the mixture is calculated as follows:

$$\frac{\text{wt. of component (or wt. of water)}}{100 \text{ wt. units of activated carbon}} \times 100$$

An aqueous mixture is formed consisting essentially of in percent by weight based on carbon about 5% to about 8% organic binder, about 4% to about 20% bentonite clay, about 2% to about 10% cellulose fibers, and the balance of the mixture being the activated carbon particles.

Other components can be present in the mixture such as forming, aids, for example extrusion aids, lubricants, and surfactants.

More advantageously, the organic binder content is about 6% to about 7% and most advantageously about 6% by weight.

More advantageously the bentonite content is about 6% to about 15% and most advantageously about 10% to about 15% for optimum strength. Values lower than these ranges result in decreased strength.

If the cellulose fiber content is higher than about 10%, the mixture cannot be extruded. More advantageously the cellulose fiber content is about 6% to about 8% by weight.

One advantageous aqueous mixture composition which results in high strengths at elevated temperatures while preserving the surface area of the body thereby maintaining the adsorption ability for hydrocarbons comprises in percent by weight based on carbon about 6% to about 7% organic binder preferably methylcellulose, methylcellulose derivatives, and combinations of these, about 6% to about 15% bentonite clay, about 6% to about 8% cellulose fibers, and the balance of the mixture being activated carbon particles.

A more advantageous composition comprises in percent by weight based on carbon about 6% to about 7% organic binder preferably methylcellulose, methylcellulose derivatives, and combinations of these, about 10% to about 15% bentonite clay, about 6% to about 8% cellulose fibers, and the balance of the mixture being activated carbon particles.

The mixture is formed by dry blending the solid components and then mixing with water. One technique of mixing, although it is to be understood that the invention is not limited to such is to place the dry blended components in a mix muller or other type of mixer such as a sigma blade or double arm mixer. While the solids are being mixed, water is added. Once the water is added, the muller or other mixer is run until the batch compacts and becomes plasticized.

The water content in the mixture can be adjusted in order to impart optimum plasticity and handleability to the mixture. As the mixture is being mixed and water is being added, a point is reached at which the water is sufficient to wet all the particles. Continued mixing compacts the powder, removing air and the compacted powder starts to agglomerate into lumps. Continued mixing results in these lumps becoming plastic. Excess water makes these lumps too soft for the forming process. Typically, water contents of about 140% to about 180%, and more typically about 145% to about 160% based on the carbon content impart good plasticity and handleability to the mixture.

Once the mixture is observed to be well plasticized, as indicated by hand or torque rheometer, it is formed into a body.

The bodies according to the present invention can have any convenient size and shape. For example, for hydrocarbon adsorption in engine exhaust purification, the preferred shape is a cellular body such as a honeycomb structure.

Some examples of honeycombs produced by the process of the present invention, although it is to be understood that the invention is not limited to these, are those having about 94 cells/cm$^2$ (about 600 cells/in2), about 62 cells/cm$^2$ (about 400 cells/in2), or about 47 cells/cm$^2$ (about 300 cells/in2), those having about 31 cells/cm$^2$ (about 200 cells/in2), or those having about 15 cells/cm$^2$ (about 100 cells/in2). Typical wall thicknesses in catalytic converter applications, can be, for example about 0.15 mm (about 6 mils) for about 62 cells/cm$^2$ (about 400 cells/in2) honeycombs. Wall (web) thicknesses range typically from about 0.1 to about 0.6 mm (about 4 to about 25 mils). The external size and shape of the body is controlled by the application and is not limited to those described above. For example, other combinations of cell densities and wall thicknesses can be made.

The forming can be done by any method that makes use of shaping a plasticized mixture. The preferred method of forming is by extrusion. A ram extruder is typically used, although any extrusion equipment known in the art can be used such as a continuous auger or twin screw extruder.

In forming honeycomb structures, it is preferred to extrude the mixture through a honeycomb die. One of the main features of the batch mixtures of the present invention is that with both bentonite and cellulose fibers, the extrudability and stiffness of the batch allows it to be handled without deformation of the formed body.

If desired, the formed body can be cut into parts of varying sizes with lengths depending on the end use or as required for ease of handling and further processing.

The resulting formed body is then dried at temperatures not higher than about 100° C. Because the bodies have a relatively high water content due mostly to the porosity of the carbon particles, care is taken to ensure that the bodies dry slowly and evenly so that they do not crack.

One preferred drying technique involves wrapping the bodies in aluminum foil and placing in a dryer set at no higher than about 100° C., typically at about 95° C. for a sufficient time to remove the water. The foil creates a humid environment so that the extruded body dries slowly and uniformly thus preventing cracking. Drying time can vary depending on the size of the body. For example, for a 2.54 cm (1") diameter, 22.9 cm (9") long honeycomb, the drying time is typically about 4 days.

The strength, that is, both the wet strength and dried strength of activated carbon bodies produced by the method of the present invention is higher than that of bodies which contain only organic binders.

To more fully illustrate the invention, the following non-limiting examples are presented. All parts, portions, and percentages are on a weight basis unless otherwise stated.

Activated carbon mixtures were made up according to the compositions given in Table 1 with the balance being activated carbon. The activated carbon was a mixture of about 80% Calgon ® Carbon BPL-F3 and about 20% Nuchar ® SN-20. The water content ranged from about 145% to about 155%.

TABLE 1

| Constituent Wt. % Based on Carbon | Sample No. | | | | | | | |
|---|---|---|---|---|---|---|---|---|
| | 1 | 2 | 3 | 4 | 5 | 6 | 7 | 8 |
| Organic binder | 6 | 6 | 6 | 6 | 6 | 6 | 6 | 6 |
| PVA | 2 | 0 | 2 | 0 | — | — | — | — |
| Bentonite | 0 | 6 | 0 | 6 | 10 | 15 | 10 | 15 |
| Cellulose Fibers | 0 | 0 | 8 | 8 | — | — | 8 | 8 |

The following procedure was followed to make activated carbon honeycombs.

Each mixture was formed by dry blending the dry constituents and thereafter adding water to form a plasticized batch. The plasticized mixtures were extruded in a ram extruder into 2.54 cm (1") diameter 2.54 cm (1") long honeycombs having 31 cells/cm$^2$ (200 cells/in$^2$) and wall thicknesses of about 0.38 mm (about 15 mil). Several honeycomb samples were made from each composition. Each honeycomb was wrapped in aluminum foil and dried at about 95° C. for about 4 days.

Hot Aging Test

Since there are conditions under which the activated carbon can be used, such as the cold start application in auto exhaust conversion, (about the first 120 seconds following engine start-up), these materials see some modest temperatures of about 200°–250° C. Also, in order to desorb the adsorbed hydrocarbons, heated air is passed through the honeycombs. The temperature affects how completely these are removed. Therefore, a hot aging test is important.

This test consists of measuring the axial crushing strength of honeycombs to obtain the strength. Samples are measured in the as-formed and dried state and then after aging additional samples at a series of temperatures in air for about 4 hours. A new set of samples is used for each temperature.

Strengths are measured according to the following procedure. The test samples were 2.54 cm (1") diameter by 2.54 cm (1") long honeycombs. These were put into a furnace and heated to the aging temperature in an air atmosphere and held at that temperature for about 4 hours. After cooling, they were measured for crushing strength in a compression tester made by Tinius Olsen at a cross head rate of about 2.54 ram (about 0.1")/min. Each sample number reported is an average of measurements on four different pieces. Strengths were measured at room temperature on as-dried or on dried samples which were thermally aged at the various temperatures in air for about 4 hours.

The results of the strength tests are given in Table 2.

TABLE 2

| | Crushing Strength After Aging At Temperature PSI | | | |
|---|---|---|---|---|
| Sample No. | Dried | 200 | 225 | 250 |
| 1 | 399 | 225 | 45 | Failure |
| 2 | 663 | 145 | 76 | 91 |
| 3 | 965 | 626 | 239 | — |
| 4 | 603 | 193 | 69 | 56 |
| 5 | 942 | 281 | 223 | — |
| 6 | 918 | 433 | — | 375 |
| 7 | 897 | 392 | — | 166 |
| 8 | 850 | 469 | — | 273 |

Surface area was measured by single point 2 BET technique using a Flowsorb instrument (Model 2 00, made by Micromeritic Inst. Corp.) Surface area was measured on as-dried samples only.

The surface area was not changed significantly and remained in the range of about 900 to about 1100 m$^2$/g.

Samples 4, 7, and 8, which had both bentonite and cellulose exhibited superior mixture and extrusion properties. The mixtures were tough handleable, and cohesive and extruded into well-formed easily handled bodies which maintained their as-extruded shape with essentially no deformation.

From Table 2 it can be seen that all the samples with the bentonite and/or cellulose had higher strength than control No. 1. Samples 7 and 8 which had the preferred levels of bentonite and cellulose had the highest strength values at a given temperature. Control No. 1 had a relatively high strength in the dried state. However, after aging, the composition of sample No. 1 showed a significant drop in strength after aging above about 175° C. After about 225° C. the strength was about 45 psi. After about 250° C. the samples became too weak to test. It can be seen that the samples of the present invention maintain their strength even after aging at the higher temperatures.

These trends are shown in FIG. 1 which is a plot including the strength values in Table 2 for control No. 1 and inventive samples 7 and 8 after aging at the various temperatures.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making an activated carbon body, said method consisting essentially of:
   a) forming an aqueous mixture consisting essentially of in percent by weight based on carbon,
      about 5% to about 8% organic binder selected from the group consisting of cellulose ethers, cellulose ether derivatives, and combinations thereof,
      about 4% to about 20% bentonite clay,
      about 2% to about 10% cellulose fibers,
      and the balance being activated carbon particles;
   b) forming said mixture into a body; and
   c) drying the body to produce said activated carbon body.

2. A method of claim 1 wherein said activated carbon particles consist of about 75% to about 85% fine carbon powders having an average particle size of about 3 to about 10 micrometers in diameter, and about 15% to about 25% coarse carbon powders having an average particle size of about 20 to about 50 micrometers in diameter.

3. A method of claim 1 wherein said organic binder is selected from the group consisting of methylcellulose, ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof.

4. A method of claim 1 wherein said organic binder content is about 6% to about 7% by weight.

5. A method of claim 1 wherein said bentonite content is about 6% to about 15% by weight.

6. A method of claim 5 wherein said bentonite content is about 10% to about 15% by weight.

7. A method of claim 1 wherein said cellulose fiber content is about 6% to about 8% by weight.

8. A method of claim 1 wherein in percent by weight based on carbon, the organic binder content is about 6% to about 7%, the bentonite content is about 6% to about 15%, and the cellulose fiber content is about 6% to about 8%.

9. A method of claim 8 wherein said bentonite content is about 10% to about 15% by weight.

10. A method of claim 1 wherein the body is a honeycomb structure.

11. A method of claim 1 wherein the forming is done by extruding the mixture.

12. An activated carbon body produced by the method of claim 1.

* * * * *

UNITED STATES PATENT AND TRADEMARK OFFICE
CERTIFICATE OF CORRECTION

PATENT NO. : 5,376,609
DATED : December 27, 1994
INVENTOR(S) : Donald L. Guile

It is certified that error appears in the above-indentified patent and that said Letters Patent is hereby corrected as shown below:

Col. 6, line 22, "mixture-" should be "mixture."

Col. 7, line 45, "ram" should be "mm"

Col. 7, line 65, "$_2$" should be "$N_2$"

Col. 8, lines 11-13, delete "Samples 7 and 8 which had the preferred levels of bentonite and cellulose had the highest strength values at a given temperature."

Signed and Sealed this

Sixteenth Day of May, 1995

BRUCE LEHMAN

*Attest:*

*Attesting Officer*   *Commissioner of Patents and Trademarks*